United States Patent
Mitsubori et al.

(10) Patent No.: US 9,506,563 B2
(45) Date of Patent: Nov. 29, 2016

(54) PARKING BRAKE SYSTEM FOR VEHICLE

(71) Applicant: HONDA MOTOR CO., LTD., Tokyo (JP)

(72) Inventors: Toshimasa Mitsubori, Wako (JP); Kazuhiro Norita, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 56 days.

(21) Appl. No.: 14/191,754

(22) Filed: Feb. 27, 2014

(65) Prior Publication Data

US 2014/0291109 A1 Oct. 2, 2014

(30) Foreign Application Priority Data

Mar. 28, 2013 (JP) ................................. 2013-069929

(51) Int. Cl.
*F16H 63/34* (2006.01)
(52) U.S. Cl.
CPC ................................ *F16H 63/3416* (2013.01)
(58) Field of Classification Search
CPC ......................... F16H 63/3416; F16H 63/3425
USPC ...................................................... 192/219.5
See application file for complete search history.

(56) References Cited

U.S. PATENT DOCUMENTS

| 2,905,016 | A | * | 9/1959 | Gorsky | G05G 5/06 74/473.21 |
|---|---|---|---|---|---|
| 2,964,135 | A | * | 12/1960 | Sand | 188/69 |
| 3,361,234 | A | * | 1/1968 | Runyon | 192/219.5 |
| 4,513,847 | A | * | 4/1985 | Hansen | 192/219.5 |
| 2006/0163024 | A1 | * | 7/2006 | Yamamoto | 192/219.4 |

FOREIGN PATENT DOCUMENTS

| EP | 0571274 A1 * | 11/1993 | ............ B60T 1/00 |
|---|---|---|---|
| JP | 4-132819 U | 12/1992 | |

* cited by examiner

*Primary Examiner* — Richard Lorence
(74) *Attorney, Agent, or Firm* — Squire Patton Boggs (US) LLP

(57) ABSTRACT

The vehicle can include a power transmission system for transmitting power of an internal combustion engine to drive wheels through transmissions and a parking brake system for restraining rotation of the drive wheels by engaging with a part of the power transmission system. The parking brake system for the vehicle can also include a parking drive mechanism which operates a restraining member, by turning of an input shaft of a shift drive mechanism for changing the shift position in the transmission, so as to restrain rotation of transmission gear shafts, and thereby establish a parking brake state. In the parking brake system, a shift cable connected to the input shaft is connected to a parking operation lever.

5 Claims, 12 Drawing Sheets

PARKING BRAKE SYSTEM FOR VEHICLE

BACKGROUND

1. Field

Embodiments of the present invention relate to a parking brake system for a vehicle.

2. Description of the Related Art

In four-wheel drive vehicles and the like, there has been an exemplary configuration as follows. In the configuration, an output shaft of a transmission is fixed by an operation of a parking operation lever through a parking cable. In addition, Japanese Utility Model Laid-Open No. Hei 4-132819 (Patent Document 1) describes that by operating the parking operation lever, an electrical switch is turned on to operate a solenoid valve, whereby an actuator is driven to operate a restraining member, which fixes a driven shaft on the drive wheel side of a differential gear unit, so as to fix both left and right wheels, thereby establishing a parking state (see, for example, Patent Document 1).

In the configuration described in Patent Document 1, by an operation of the parking operation lever and through the parking cable, a drum brake is operated so as to fix the output shaft of the transmission. Simultaneously, a rear driven shaft of a center differential, provided for distributing power to the front wheels and the rear wheels, is fixed by a shift sleeve moved through driving of an air actuator.

SUMMARY

In the parking brake system disclosed in Patent Document 1, a parking state is established by operating a parking brake lever provided exclusively for parking. It is considered, therefore, that a gear shifting mechanism for changing the shift position in the transmission by operating a gear shift lever or the like is arranged separately from the parking brake system.

Therefore, the parking drive mechanism is configured separately from the gear shifting mechanism, which leads to an increased number of component parts and a complicated structure. In addition, the system is said to be difficult to be good in operability.

The present invention has been made in consideration of the above-mentioned points. Accordingly, it is an object of the present invention to provide a parking brake system for a vehicle that is reduced in the number of component parts, is simple in structure and is excellent in operability.

In order to attain the above object, certain embodiments of the present invention are set forth below.

In certain embodiments, the invention can include a vehicle having a power transmission system for transmitting power of an internal combustion engine (E) to drive wheels through a transmission (Tm, Ts). The vehicle can also include a parking brake system for restraining rotation of the drive wheels by engaging with a part of the power transmission system, the parking brake system including a parking drive mechanism adapted to operate a restraining member, by turning of an input shaft of a shift drive mechanism for changing a shift position in the transmission, so as to restrain rotation of a transmission gear shaft, thereby establishing a parking brake state. A shift cable connected to the input shaft is connected to a parking operation lever.

In other embodiments, the vehicle is a four-wheel drive vehicle. The drive wheels provided in a left-right pair receive power transmitted thereto through a differential gear unit. The differential gear unit includes a differential lock mechanism, and the differential lock mechanism is operated by a parking operation of the parking operation lever through a parking cable.

In other embodiments, the transmission includes a main transmission on an upstream side with respect to power transmission and a sub transmission on a downstream side with respect to the power transmission. The parking drive mechanism is provided on the sub transmission, and operates the restraining member so as to restrain rotation of the transmission gear shaft of the sub transmission, thereby establishing the parking brake state.

In other embodiments, the parking drive mechanism swings a parking rotation-restraining lever, which is the restraining member, so as to lock a locking part of the parking rotation-restraining lever into a lock groove formed in an outer circumference of a shift clutch receiving member, thereby establishing the parking brake state.

In other embodiments, the sub transmission includes a high-speed shift clutch receiving member and a low-speed shift clutch receiving member, and the shift clutch receiving member is the low-speed shift clutch receiving member.

According to certain embodiments of the parking brake system, the system includes the parking drive mechanism adapted to operate the restraining member, by turning of the input shaft of the shift drive mechanism for changing the shift position in the transmission, so as to restrain rotation of the transmission gear shaft, thereby establishing the parking brake state. In addition, the shift cable connected to the input shaft is connected to the parking operation lever so that a gear shifting operation is also conducted by the parking operation lever provided for carrying out a parking operation. Therefore, it is possible to reduce the number of component parts and to realize a simplified structure. In addition, the parking operation can also be carried out in the manner of extending the gear shifting operations. Thus, the system is excellent in operability.

According to other embodiments of the parking brake system for the vehicle, the differential lock mechanism of the differential gear unit is operated by a parking operation of the parking operation lever through the parking cable. Therefore, by the parking operation of the parking operation lever and separately through the parking cable, the parking drive mechanism is made to operate the restraining member, to restrain rotation of the transmission gear shaft. As a result of this, it is possible to fix and restrain rotation of the pair of left and right drive wheels, thereby putting the four-wheel drive vehicle into the parking brake state.

According to other embodiments of the parking brake system for the vehicle, the transmission includes the main transmission on the upstream side with respect to power transmission and the sub transmission on the downstream side with respect to the power transmission. In addition, the parking drive mechanism is provided on the sub transmission (Ts), and operates the restraining member so as to restrain rotation of the transmission gear shaft of the sub transmission, thereby establishing the parking brake state. Since the rotation of the transmission gear shaft of the sub transmission near the drive wheels is restrained, the drive wheels can be fixed, with reduced chattering.

In addition, the sub transmission has a small number of gear positions, and the operational range of the parking operation lever has an allowance. Therefore, even where the parking operation is incorporated in the operational range, the operational range for the parking position can be made comparatively large, and good operability can be maintained.

According to other embodiments of the parking brake system for the vehicle, the parking drive mechanism is so configured that, by swinging the parking rotation-restraining lever provided as a restraining member, the locking part of the restraining member is locked into the lock groove formed in the outer circumference of the shift clutch receiving member supported on the transmission gear shaft, resulting in the parking brake state. Therefore, the shift clutch receiving member for receiving the clutch teeth of the shifter member can be used also for parking. Accordingly, it is possible to reduce the number of component parts and to reduce the size of the sub transmission.

According to other embodiments of the parking brake system for the vehicle, the sub transmission includes the high-speed shift clutch receiving member and the low-speed shift clutch receiving member. In addition, the above-mentioned shift clutch receiving member is the low-speed shift clutch receiving member. Therefore, by a process wherein the low-speed shift clutch receiving member connected to the low-speed gear pair having a high transmission gear ratio is utilized for parking brake, the drive wheels can be fixed by a comparatively large force at the time of parking. Besides, a reduction in the size of the sub transmission can be contrived.

DETAILED DESCRIPTION

Now, certain embodiments of the present invention will be described below, based on FIGS. 1 to 13.

Figure 1:
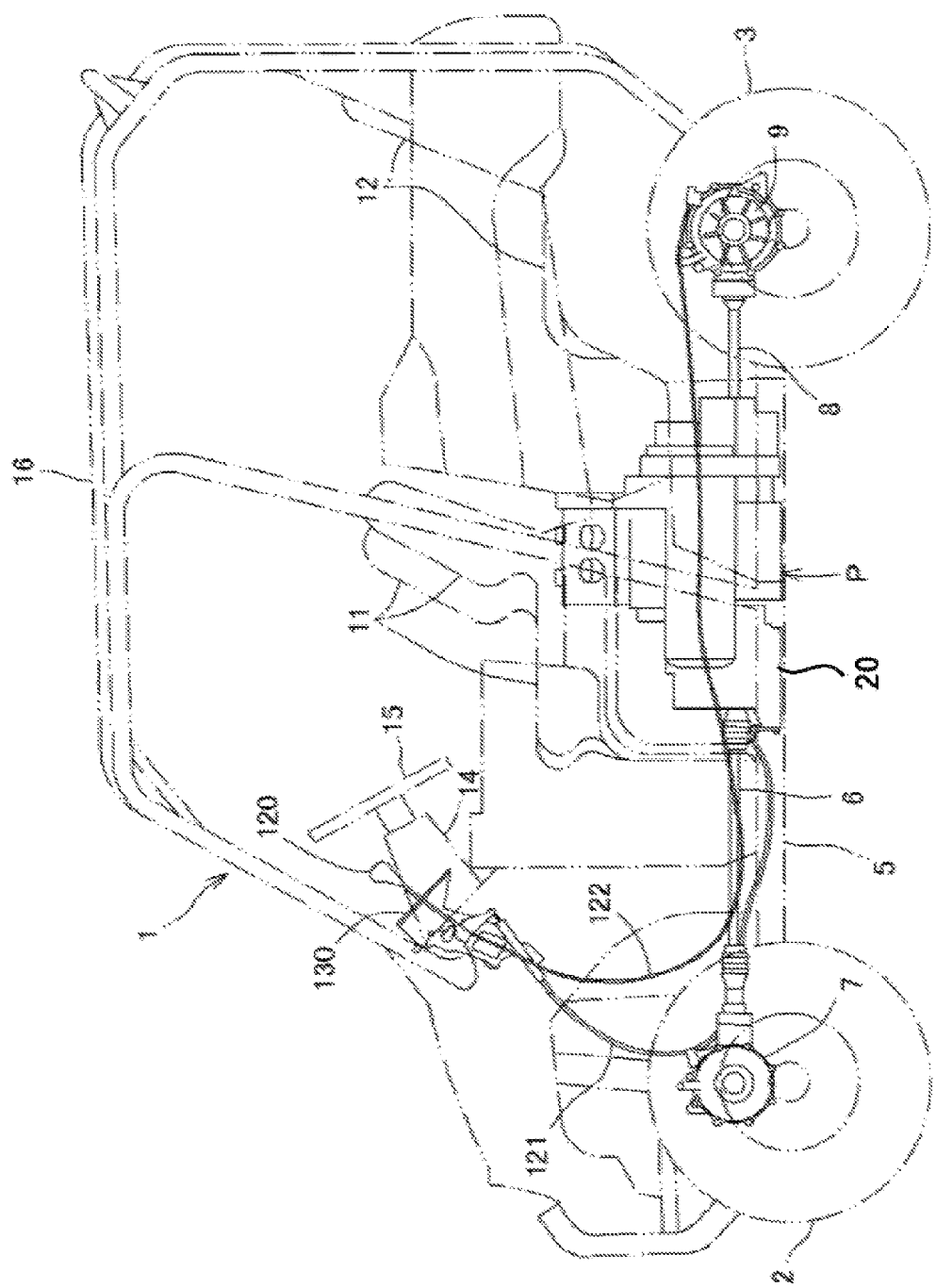
FIG. 1 is a side view of an all terrain vehicle provided with a parking brake system for a vehicle according to certain embodiments.

A side view of an all terrain vehicle 1 provided with a parking brake system for a vehicle according to certain embodiments is shown in FIG. 1.

The all terrain vehicle 1 with power unit P mounted thereon is a roofed five-seater vehicle capable of four wheel drive.

Referring to FIG. 1, the all terrain vehicle 1 has a structure in which a pair of left and right front wheels 2, 2 and a pair of left and right rear wheels 3, 3, with low-pressure balloon tires mounted thereon, are suspended on a body frame 5 at front and rear positions.

At a longitudinal-vehicle-directionally central position of the body frame 5, the power unit P is mounted, with a crankshaft 21 of an internal combustion engine E oriented in the longitudinal vehicle direction. An output shaft (transmission driven shaft) 51 of the power unit P is protruding in the longitudinal direction. Rotating power of the output shaft 51 is transmitted from the front end of the output shaft 51 to the left and right front wheels 2, 2 through a front drive shaft 6 and a front differential gear unit 7, and is transmitted from the rear end of the output shaft 51 to the left and right rear wheels 3, 3 through a rear drive shaft 8 and a rear differential gear unit 9.

The front differential gear unit 7 and the rear differential gear unit 9 have a differential lock mechanism added thereto. A clutch mechanism engaged and disengaged to allow and interrupt transmission of power to the front wheels, thereby switching between four wheel drive and two wheel drive, is incorporated in the front differential gear unit 7.

On the upper side of the power unit P, three front seats 11 are arranged side by side in the left-right direction. At a rear portion of the body frame 5, two rear seats 12 are arranged side by side in the left-right direction.

The central one of the front seats 11 is a driver's seat, which is a little protruding forward as compared with the left and right front seats 11.

Forwardly of this driver's seat, a steering wheel 15 is provided in the state of protruding from a steering column 14.

A parking operation lever 120 is arranged at an operation panel 130 in the vicinity of the steering column 14.

The front seats 11 and the rear seats 12 are covered with a roof 16 on the upper side thereof.

In the power unit P mounted on the all terrain vehicle 1, an in-line two-cylinder water-cooled four-stroke internal combustion engine E is combined with a main transmission Tm and a sub transmission Ts, which constitute a power transmission system 20.

The power unit P is mounted on the body frame 5 in a so-called longitudinal posture in which the crankshaft 21 of the internal combustion engine E is oriented in the longitudinal vehicle direction.

As shown in FIG. 1, a shift cable 121 and a parking cable 122 extend from the parking operation lever 120. The shift cable 121 is connected to the tip end of a shift operating lever 100 having a base end fitted to a shift spindle 101 projecting to the front side of the sub transmission Ts.

The parking cable 122 extends toward the rear side of the vehicle, and is connected to an operating part of a differential lock mechanism 160 added to the rear differential gear unit 9.

Figure 2:
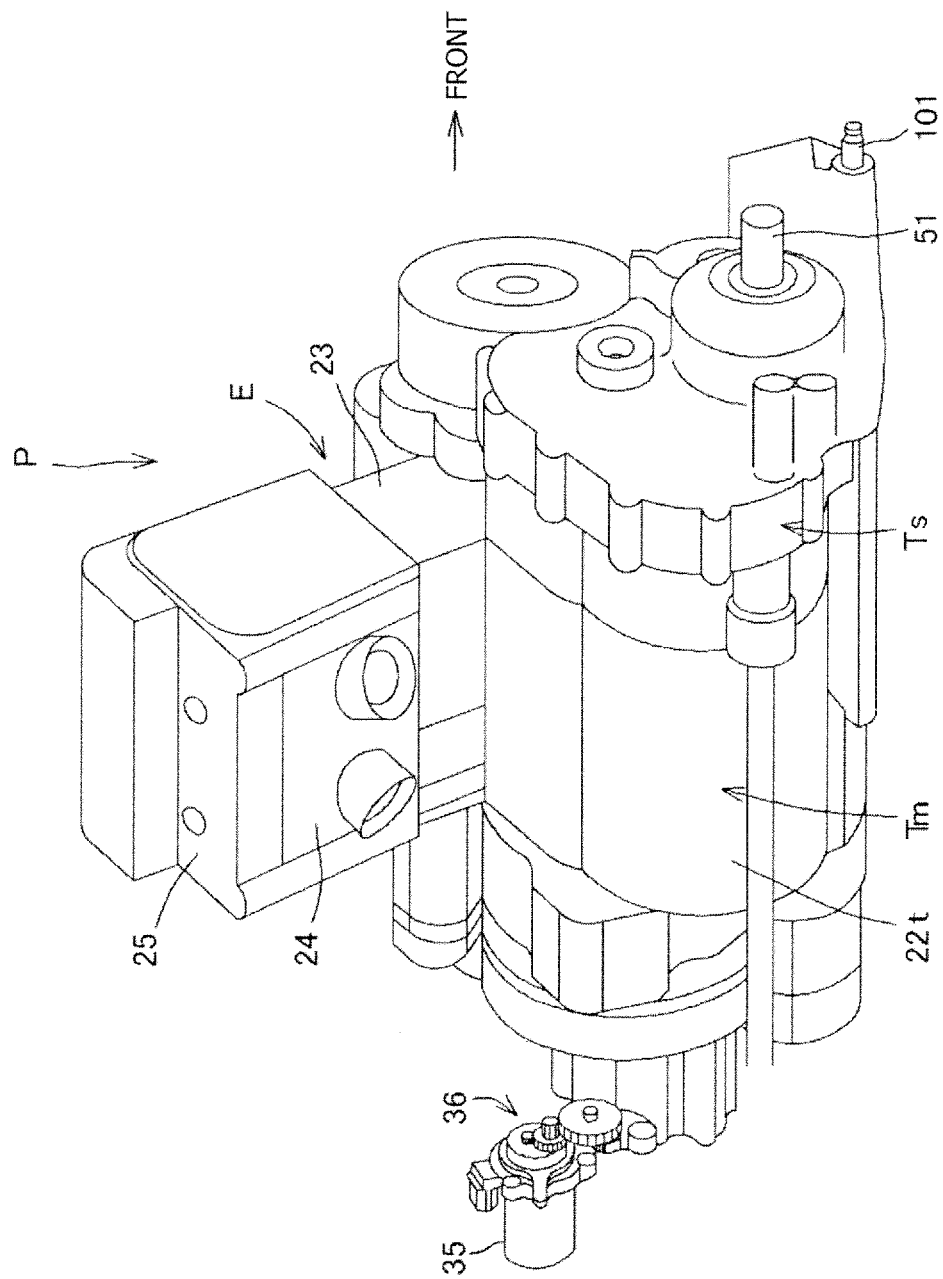
FIG. 2 is a general perspective view of a power unit in certain embodiments.
Figure 3:
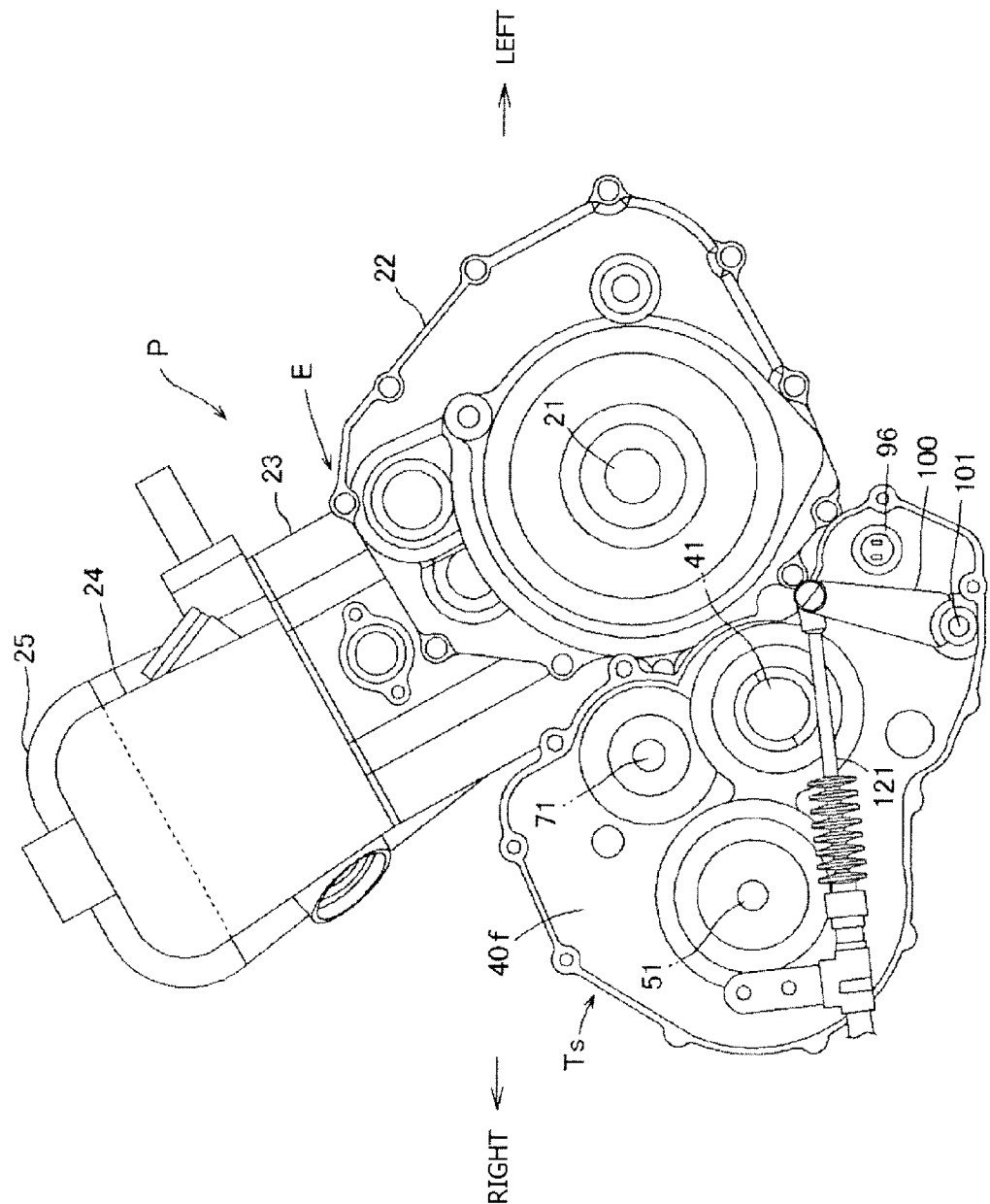
FIG. 3 is a front view of the power unit.

Referring to FIGS. 2 and 3, the power unit P has a cylinder block 23, a cylinder head 24, and a cylinder head cover 25 sequentially stacked and projecting obliquely toward a right upper side of a crankcase 22, on which the crankshaft 21 of the internal combustion engine E is rotatably supported.

The crankcase 22 is bulged rightward to constitute a main transmission case 22t for accommodating the main transmission Tm.

The main transmission Tm is located at the right side of the crankshaft 21 of the internal combustion engine E. The sub transmission Ts is projectingly provided while substantially overlapping on the front side of the main transmission Tm.

Figure 5:
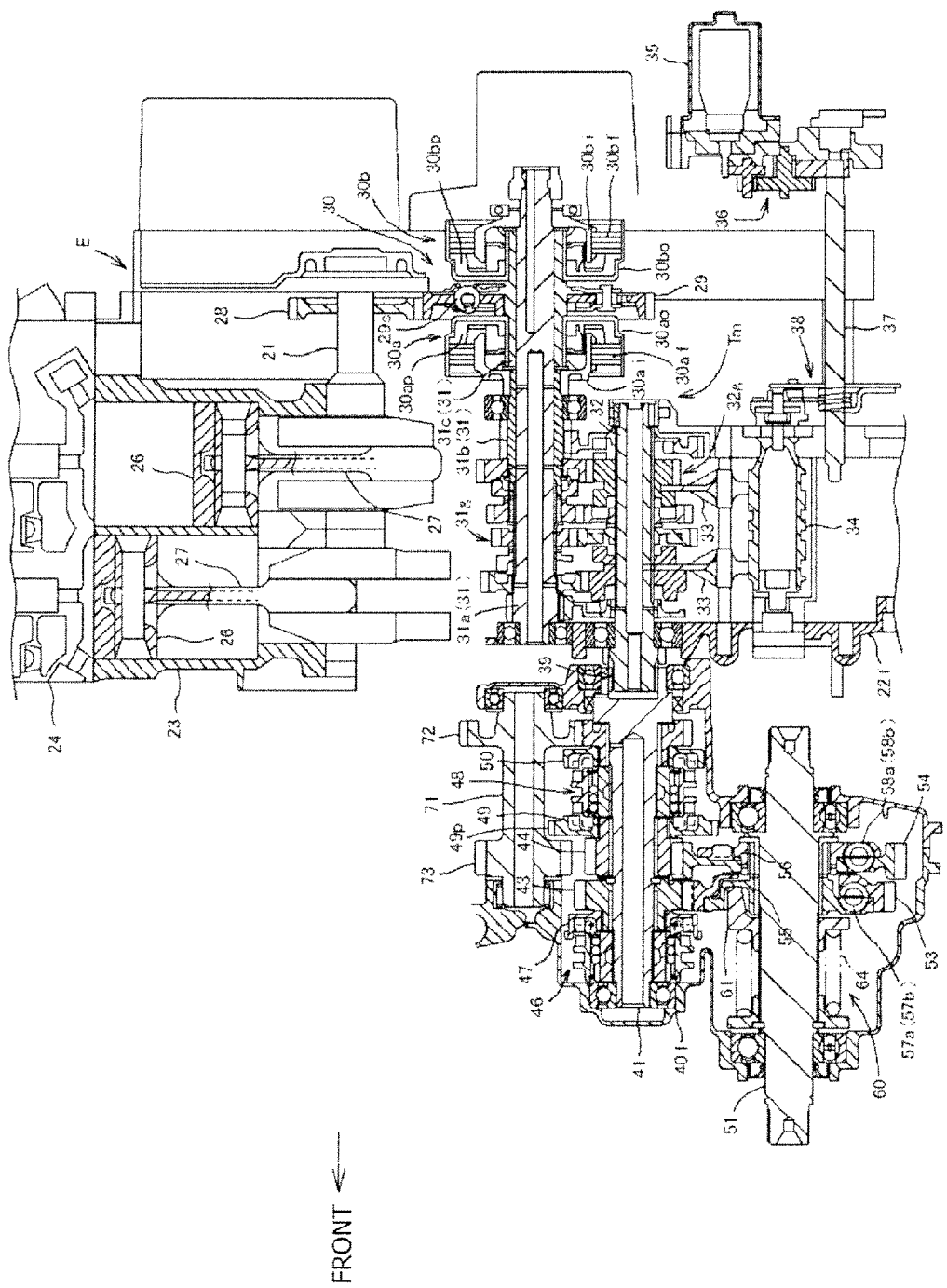
FIG. 5 is a sectional view of a power transmission device, showing a general view of a power transmission system of the power unit.

The whole part of the power transmission system 20 is shown in section in FIG. 5.

In the cylinder block 23 of the internal combustion engine E, two cylinders are formed in the state of being arranged in line (in series) in the longitudinal vehicle direction. A piston 26 slidably reciprocated in each of cylinder bores of the cylinders and the crankshaft 21 are interconnected by a connecting rod 27, whereby a reciprocating motion of the piston 26 is converted into rotation of the crankshaft 21, before being outputted.

A primary driving gear 28 is fitted onto a front end portion of the crankshaft 21, which is oriented in the longitudinal vehicle direction.

A main shaft 31 of the main transmission Tm located on the right side of the crankshaft 21 has a configuration wherein a main shaft outer tube 31b and a clutch part outer tube 31c, arranged juxtaposedly in a left-right relationship, are rotatably fitted over an outer circumference of a long main shaft inner tube 31a.

The main shaft 31 is provided with six driving transmission gears 31g. A counter shaft 32 is provided with six driven transmission gears 32g, which correspond to and are constantly meshed with the six driving transmission gears 31g.

The driving transmission gears 31g for odd-numbered speeds are provided on the main shaft inner tube 31a, while the driving transmission gears 31g for even-numbered speeds are provided on the main shaft outer tube 31b.

A paired twin clutch 30 composed of a first clutch 30a and a second clutch 30b is configured on the clutch part outer tube 31c. A primary driven gear 29 is provided at the center of the clutch part outer tube 31c, and clutch outers 30ao and 30bo of the first clutch 30a and the second clutch 30b are provided on both sides of the primary driven gear 29 in spline fit and with restraints on axial movement.

The primary driven gear 29 at the center is meshed with the primary driving gear 28 provided on the crankshaft 21.

In addition, a clutch damper spring 29s is interposed between the primary driven gear 29 and a flange part at the center of the clutch part outer tube 31c. Variations in torque between the primary driven gear 29 and the clutch part outer tube 31c are damped by the clutch damper spring 29s.

Besides, a clutch inner 30ai of the first clutch 30a is spline fitted to the main shaft inner tube 31a, with restraints on axial movement. A clutch inner 30bi of the second clutch 30b is spline fitted to the main shaft outer tube 31b, with restraints on axial movement.

A friction disc group 30af (30bf) in which co-rotated driving friction discs on the clutch outer 30ao (30bo) side and co-rotated driven friction discs on the clutch inner 30ai (30bi) side are alternately arranged can be pressed by a pressure plate 30ap (30bp).

An oil hydraulic circuit for selectively driving the pressure plates 30ap and 30bp is formed in the main shaft inner tube 31a, the clutch part outer tube 31c and a right crankcase cover.

When the pressure plate 30ap is driven to press the friction disc group 30af, the clutch 30a is engaged. As a result, power inputted to the primary driven gear 29 is transmitted to the main shaft inner tube 31a, and the driving transmission gears 31g for the odd-numbered speeds are rotated.

When the pressure plate 30bp is driven to press the friction disc group 30bf, the second clutch 30b is engaged. As a result, power inputted to the primary driven gear 29 is transmitted to the main shaft outer tube 31b, and the driving transmission gears 31g for the even-numbered speeds are rotated.

Two of the six driving transmission gears 31g supported on the main shaft 31 are shifter gears which slide in the axial direction. Two of the six driven transmission gears 32g supported on the counter shaft 32 are shifter gears which slide in the axial direction.

Shift forks 33, 33 for moving the two shifter gears on the counter shaft 32 are provided in the state of being supported on a shift fork shaft 33a.

Shift forks 33, 33 for moving the two shifter gears on the main shaft 31 and a shift fork shaft are also provided, though not shown in the drawings.

As a shift drum 34 is turned, the four shift forks 33 are moved while being guided by guide grooves formed in an outer circumferential surface of the shift drum 34, whereby meshing of the gears relevant to effective power transmission is changed over.

The shift drum 34 is turned by a shift motor 35.

A driving force of the shift motor 35 is converted into turning of a shift spindle 37 through a speed reduction gear mechanism 36, and the turning of the shift spindle 37 is converted into turning of the shift drum 34 through an intermittent feed mechanism 38.

Therefore, the main transmission Tm can perform transmission with smooth shifting among first to sixth speeds (gear positions), through oil hydraulic control at the twin clutch 30 and drive control at the shift motor 35.

The output shaft of the main transmission Tm is the counter shaft 32 that protrudes forward by penetrating through a front-side wall 22f of the crankcase 22.

The power unit P has the sub transmission Ts provided forwardly of the main transmission Tm.

The sub transmission Ts has therein a configuration in which a front-side sub transmission case 40f and a rear-side sub transmission case 40r, as front and rear divisional portions, are united together.

Figure 4:
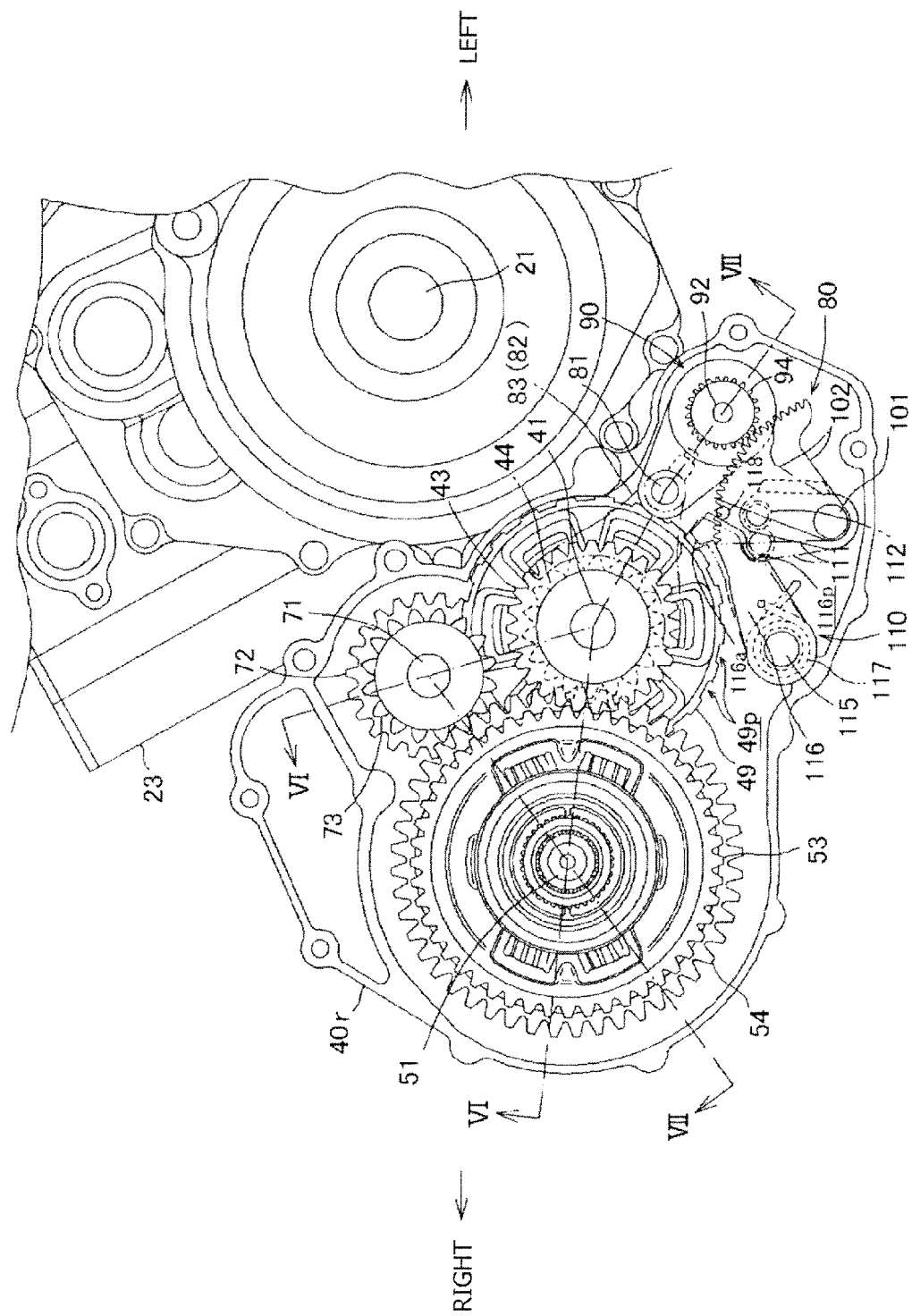
FIG. 4 is a front view of a sub transmission in a state wherein a front-side sub transmission case has been detached.

As shown in FIG. 4, which is a front view showing a state wherein the front-side sub transmission case 40f of the sub transmission Ts has been detached, a transmission driving shaft 41 and a transmission driven shaft 51 whose transmission gears are meshed with each other, of the sub transmission Ts, are juxtaposedly arranged on the left and right sides. An intermediate gear shaft 71 is disposed at a position on an obliquely upper side of the transmission driving shaft 41 and the transmission driven shaft 51 (at a position corresponding to a vertex of a triangle whose vertexes correspond to these three shafts).

Figure 6:
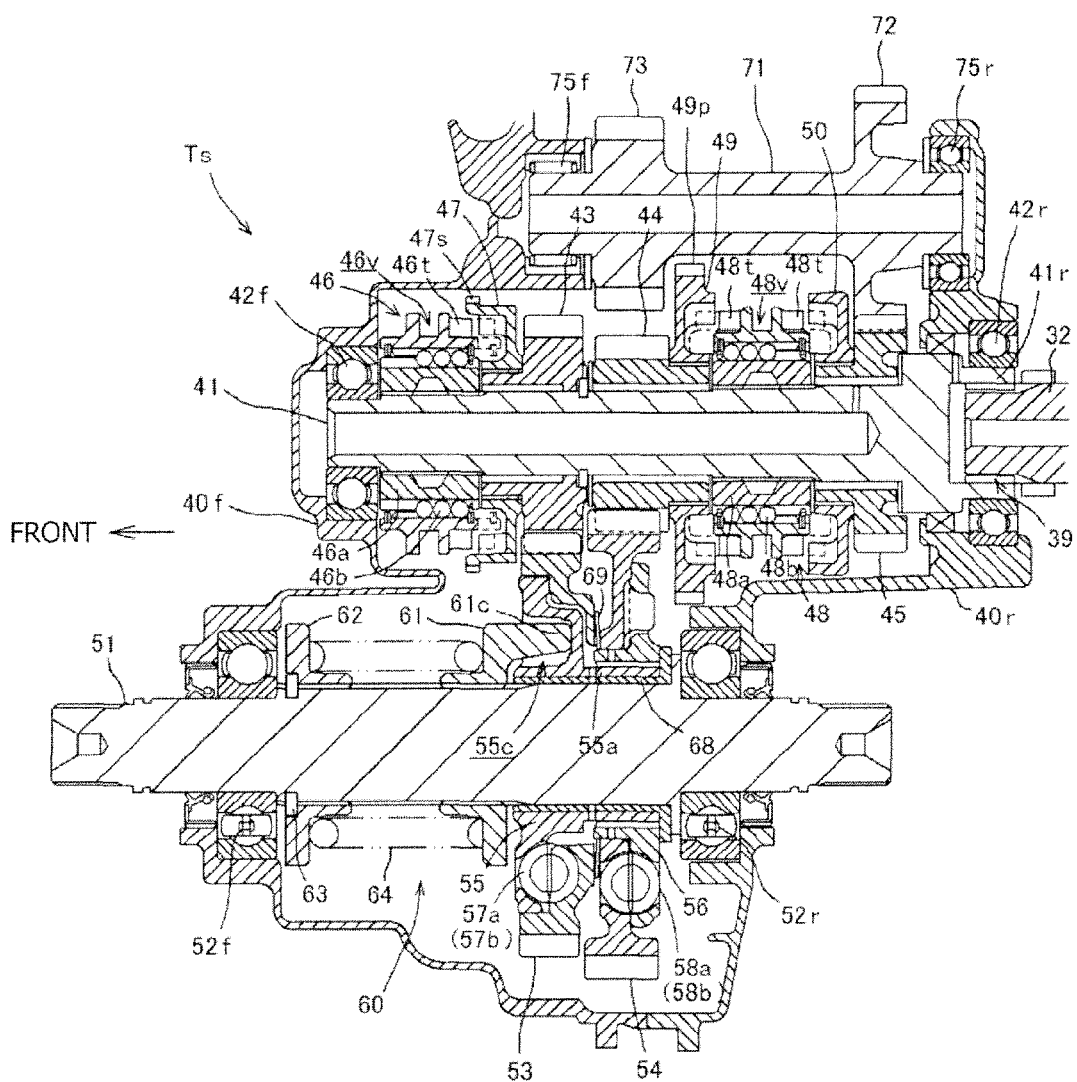
FIG. 6 is a sectional view of the sub transmission (a sectional view taken along line VI-VI of FIG. 4).
Figure 7:
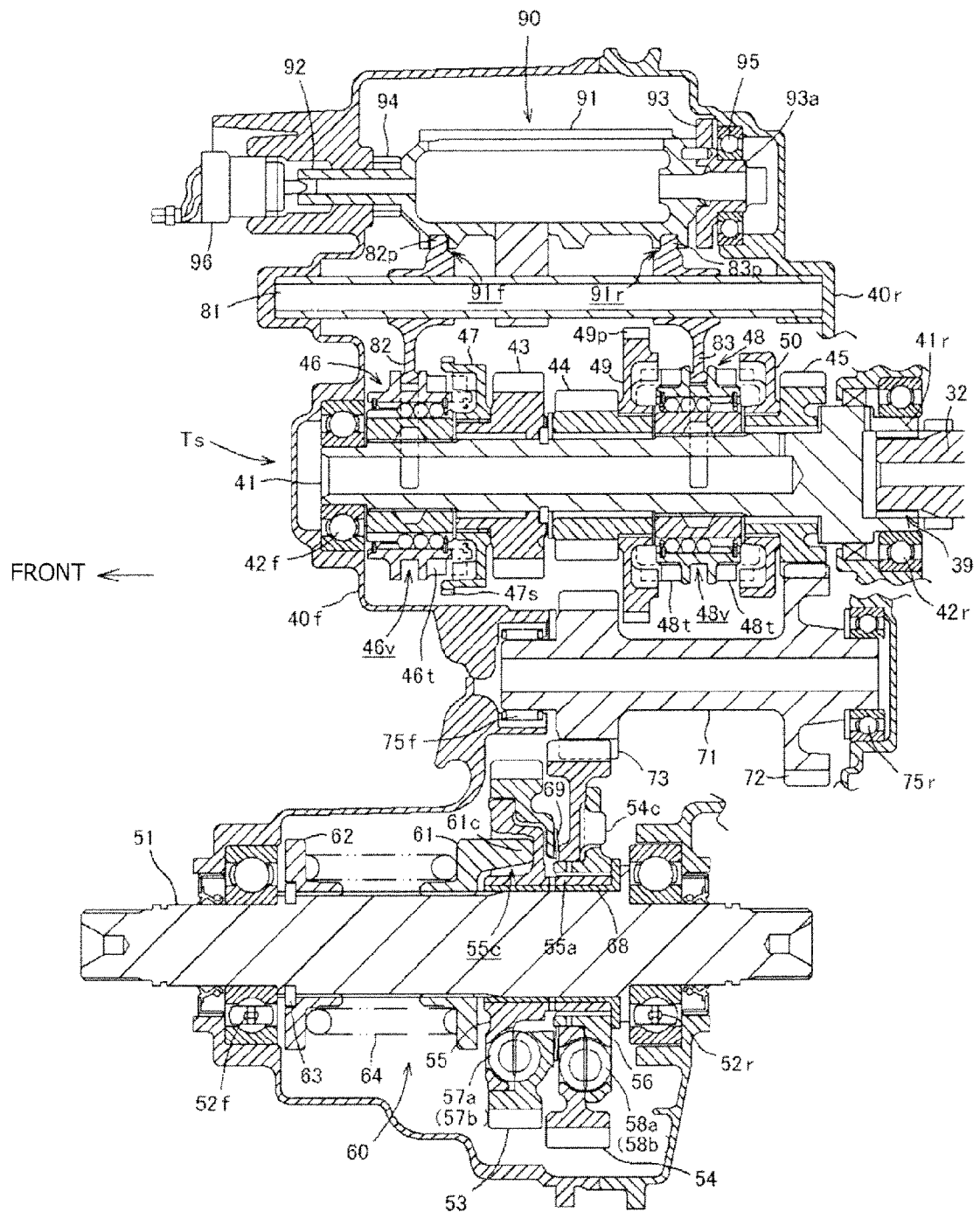
FIG. 7 is a sectional view of the sub transmission (a sectional view taken along line VII-VII of FIG. 4).

Referring to FIGS. 6 and 7, which are sectional views of the sub transmission Ts, the transmission driving shaft 41 and the transmission driven shaft 51 and the intermediate gear shaft 71 of the sub transmission Is are arranged in parallel with each other while being oriented in the longitudinal vehicle direction. In this case, the front and rear ends of these shafts are rotatably supported on the front-side sub transmission case 40f and the rear-side sub transmission case 40r.

The transmission driving shaft 41 is rotatably arranged, with its front end rotatably borne on a bearing 42f fitted in a bearing recess of the front-side sub transmission case 40f, and with its rear end rotatably borne on a bearing 42r fitted in a bearing hole in the rear-side sub transmission case 40r.

A rear end portion of the transmission driving shaft 41 constitutes a rear-end cylindrical portion 41r forming a large-diameter shaft hole. An inner circumferential surface of the rear-end cylindrical portion 41r is splined, which is exposed to the rear side. Of the counter shaft 32 protruding forward by penetrating through the front-side wall 22f of the crankcase 22 of the main transmission Tm, a front end portion which is splined is fitted in a shaft hole in the rear-end cylindrical portion 41r of the transmission driving shaft 41. In this way, the counter shaft 32 is coaxially spline fitted to the transmission driving shaft 41.

Therefore, the counter shaft 32 on the main transmission Tm side and the transmission driving shaft on the sub transmission Ts side are connected with each other at this spline fit part 39, and are rotated as one body.

On a central portion of the transmission driving shaft 41, a high-speed driving gear 43 and a low-speed driving gear 44 are rotatably supported while being juxtaposed on the front and rear sides. On a rear end portion of the transmission driving shaft 41, a reverse driving gear 45 is rotatably supported.

The transmission driving shaft 41 is provided, between the bearing 42f at the front end and the high-speed driving gear 43, with a high-speed shift clutch mechanism based on a high-speed switching shifter member 46.

The high-speed switching shifter member 46 is axially movably supported on an outer circumference of a cylindrical base portion 46a, which is spline-connected to an axial-directionally predetermined position of the transmission driving shaft 41, through a direct-acting bearing 46b. The high-speed switching shifter member 46 is formed with an annular shift fork groove 46v in a central portion thereof, and with clutch teeth 46t facing toward the rear side of the shift fork groove 46v.

Facing to the clutch teeth 46t, a high-speed shift clutch receiving member 47 is provided in fit to the high-speed driving gear 43.

Therefore, when the high-speed switching shifter member 46 is moved rearward, the clutch teeth 46t on the rear side are meshed with the high-speed shift clutch receiving member 47 fitted to the high-speed driving gear 43. As a result, the high-speed driving gear 43 is rotated together with the transmission driving shaft 41. When the high-speed switching shifter member 46 is located on the front side, power is not transmitted to the high-speed driving gear 43.

The high-speed shift clutch receiving member 47 is formed on an outer circumferential surface thereof with a plurality of projections 47s at regular intervals. Vehicle speed is detected by detecting the projections 47s by a speed sensor (not shown).

The transmission driving shaft 41 is provided, between the low-speed driving gear 44 and the reverse driving gear 45, with a low/reverse switching clutch mechanism based on a low/reverse switching shifter member 48.

The low/reverse switching shifter member 48 is axially movably supported on an outer circumference of a cylindrical base portion 48a, which is spline-connected to an axial-directionally predetermined position of the transmission driving shaft 41, through a direct-acting bearing 48. The low/reverse switching shifter member 48 is formed with a shift fork groove 48v between clutch teeth 48t, 48t which are formed facing toward the front and rear sides, respectively.

Facing to the clutch teeth 48t on the front side of the low/reverse switching shifter member 48, a low-speed shift clutch receiving member 49 is provided in fit to the low-speed driving gear 44. Facing to the clutch teeth 48t on the rear side, a reverse clutch receiving member 50 is provided in fit to the reverse driving gear 45.

Therefore, when the low/reverse switching shifter member 48 is moved forward, the clutch teeth 48t on the front side are meshed with the low-speed shift clutch receiving member 49 fitted to the low-speed driving gear 44. As a result, the low-speed driving gear 44 is rotated together with the transmission driving shaft 41. When the low/reverse switching shifter member 48 is moved rearward, the clutch teeth 48t on the rear side are meshed with the reverse clutch receiving member 50 fitted to the reverse driving gear 45. As a result, the reverse driving gear 45 is rotated with the transmission driving shaft 41.

When the low/reverse switching shifter member 48 is located in a central position between the low-speed shift clutch receiving member 49 and the reverse clutch receiving member 50 without engagement with any member, rotation of the transmission driving shaft 41 is not transmitted to either of the low-speed driving gear 44 and the reverse driving gear 45.

The low-speed shift clutch receiving member 49 is formed in an outer circumferential surface thereof with a plurality of parking lock grooves 49p arranged along the circumferential direction. The parking lock grooves 49p are used for parking stop, as will be described later.

Of the transmission driven shaft 51 disposed on the right side of and in parallel to the transmission driving shaft 41, a front portion penetrates and is rotatably borne on a bearing 52f fitted in a bearing hole in the front-side sub transmission case 40f, whereas a rear portion penetrates and is rotatably borne on a bearing 52r fitted in a bearing hole in the rear-side sub transmission case 40r. In this way, the transmission driving shaft 51 is rotatably arranged, with its front and rear ends protruding to the front and rear sides, respectively.

The transmission driven shaft 51 is an output shaft 51 of the sub transmission Ts, and, at the same time, is an output shaft 51 of the power unit P.

A high-speed driven gear 53 and a low-speed driven gear 54, which are constantly meshed respectively with the high-speed driving gear 43 and the low-speed driving gear 44, which are supported on the transmission driving shaft 11, are supported on this transmission driven shaft 51 (see FIG. 6).

Between the high-speed driven gear 53 and the transmission driven shaft 51, a first intermediate rotational member 55 is interposed while being supported on the transmission driven shaft 51 in a mutually relatively rotatable manner.

The first intermediate rotational member 55 is configured as follows. A cylindrical boss part 55a is rotatably supported on the transmission driven shaft 51 through a bush 68, which is a cylindrical bearing. In addition, a spoke part 55b formed at a front half portion of the cylindrical boss part 55a is formed with a pair of forwardly opening cam recesses 55c, 55c in center-symmetric positions. Further, rearwardly opening arcuate spring recesses 55d are formed at four positions between the cam recesses 55c, 55c in the circumferential direction of the spoke part 55b (see FIGS. 8, 9, and 10).

The spring recesses 55d are partly opening to the rear side.

The high-speed driven gear 53 is relatively rotatably supported on an outer circumference of a flange part 55b of the first intermediate rotational member 55. A spoke part 53b of the high-speed driven gear 53 is formed with forwardly opening spring recesses 53d facing respectively to the spring recesses 55d of the first intermediate rotational member 55. Damper springs 57a (57b) are interposed in a bridging manner between both the mutually facing spring recesses 53d and 55d.

Figure 10:
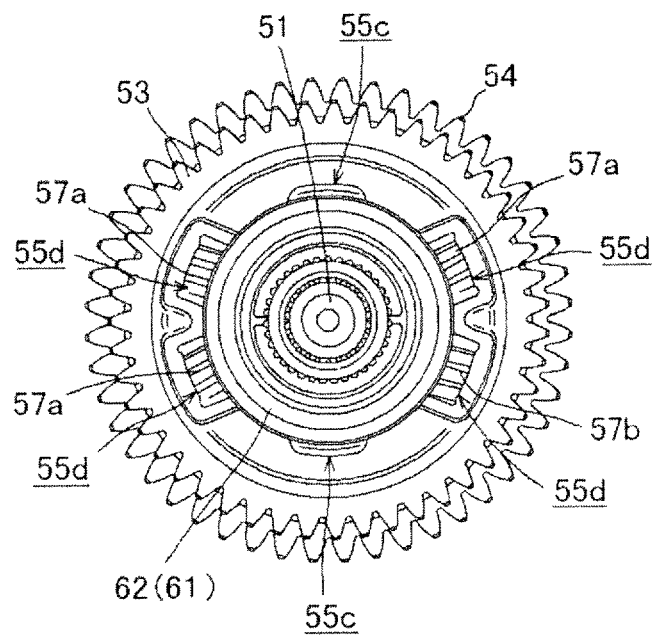
FIG. 10 is a front view of the transmission driven shaft and the member rotatably supported on the transmission driven shaft.

Of the four damper springs 57a (57b), the three damper springs 57a differ from the remaining damper spring 57b in spring characteristics (see FIG. 10).

Therefore, rotation of the high-speed driven gear 53 is transmitted through the damper springs 57a (57b) to the first intermediate rotational member 55. Between the high-speed driven gear 53 and the first intermediate rotational member, variations in torque are damped by the damper springs 57a (57b).

In this instance, since the damper springs 57a and the damper spring 57b differing in spring characteristics are mixedly present, torsional vibrations in a wide vibrational frequency range can be absorbed. As a result, vibration isolation characteristics can be enhanced.

In addition, onto an outer circumference of a rear half of the cylindrical boss part 55a of the first intermediate rotational member 55, a second intermediate rotational member 56 is serration fitted, in such a manner that the second intermediate rotational member 56 is rotated as one body with the first intermediate rotational member 55.

Figure 9:
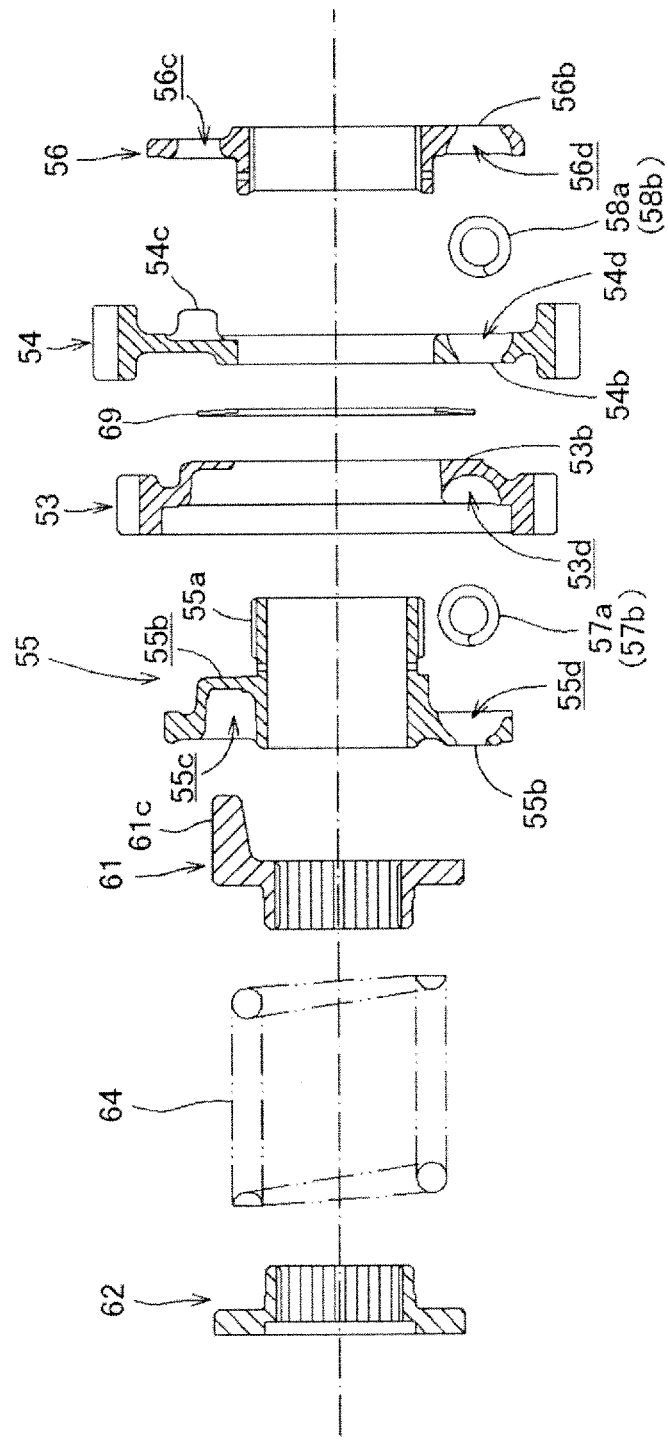
FIG. 9 is an exploded sectional view of a member rotatably supported on a transmission driven shaft.
Figure 11:
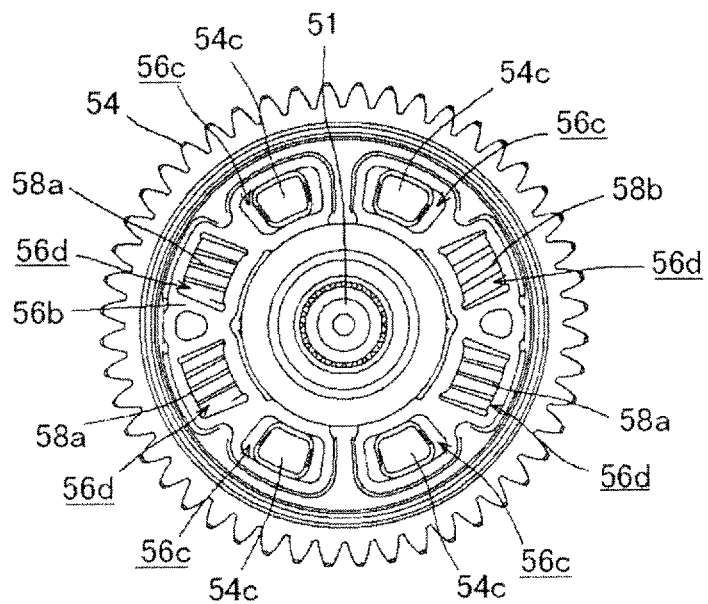
FIG. 11 is a rear view of the transmission driven shaft and the member rotatably supported on the transmission driven shaft.

A spoke part 56b of the second intermediate rotational member 56 is formed with arcuate through-holes 56c at four positions, and with forwardly opening arcuate spring recesses 56d at four positions (see FIGS. 9 and 11).

The spring recesses 56d can be partly opened to the rear side.

The low-speed driven gear 54 is relatively rotatably supported on an outer circumference of the spoke part 56b of the second intermediate rotational member 56. A spoke part 54b of the low-speed driven gear 54 is formed with rearwardly opening spring recesses 54d facing respectively to the spring recesses 56d of the second intermediate rotational member 56. Damper springs 58a (58b) are interposed in a bridging manner between both the mutually facing spring recesses 54d and 56d.

Of the four damper springs 58a (58b), the three damper springs 58a differ from the remaining damper spring 58b in spring characteristics (see FIG. 11).

Into the through-hole 56c of the second intermediate rotational member 56, a rearwardly projecting projection 54c provided at the spoke part 54b of the low-speed driven gear 54 is fitted, with some allowance, to restrict a relative rotational range.

Therefore, rotation of the low-speed driven gear 54 is transmitted through the damper springs 58a (58b) to the second intermediate rotational member 56. Between the low-speed driven gear 54 and the second intermediate rotational member 56, variations in torque are damped by the damper springs 58a (58b).

In this instance, since the damper springs 58a and the damper spring 58b differing in spring characteristics are mixedly present, torsional vibrations in a wide vibrational frequency range can be absorbed. As a result, vibration isolation characteristics can be enhanced.

Since the second intermediate rotational member is rotated as one body with the first intermediate rotational member 55, the damper springs 58a (58b) serve also as springs for damping variations in torque between the low-speed driven gear 54 and the first intermediate rotational member 55.

In addition, a coned disc spring 69 is interposed between the high-speed driven gear 53 and the low-speed driven gear 54 which are adjacent to each other.

Thus, of the high-speed driving gear 43 (the low-speed driving gear 44) and the high-speed driven gear 53 (the low-speed driven gear 54) constituting a pair of gears constantly meshed with each other, the high-speed driven gear 53 (the low-speed driven gear 54) on one side is made to be a gear accompanied by the damper springs 57a and 57b (58a and 58b) interposed between it and the transmission driven shaft 51. Therefore, the high-speed driven gear 53 (the low-speed driven gear 54) is composed of separate bodies divided by the damper springs 57a and 57b (58a and 58b). This ensures that the inertial mass of the sub transmission Ts as a whole is reduced. As a result, reaction forces of driving and torque variations attendant on a gear shift themselves can be suppressed to low levels, and it is possible to easily lower the vibration of the sub transmission Ts and, hence, the vibration of the power unit P.

The damper springs 57a and 57b (58a and 58b) are provided between the high-speed driven gear 53 (the low-speed driven gear 54) and the transmission driven shaft 51, and they need not be provided respectively, for example, on the input side and the output side of the sub transmission Ts. Consequently, the size of the sub transmission Ts and, hence, the size of the power unit P, can be reduced.

Furthermore, the transmission driven shaft 51 is equipped with a cam-type torque damper 60, which is interposed between the transmission driven shaft 51 and the first intermediate rotational member 55.

On that portion of the transmission driven shaft 51 which is located on the right side of the first intermediate rotational member 55, a male cam member 61 is supported through spline fit such as to be slidable in the axial direction but restrained from mutual rotation. The male cam member 61 has cam projections 61c, 61c fronting on the cam recesses 55c, 55c of the first intermediate rotational member 55 which faces to the male cam member 61 from the rear side.

The cam projections 61c, 61c of the male cam member 61 each project while having a cam surface of which a side surface facing in the rotational direction is inclined toward the rear side.

On the front side of the male cam member 61, a spring receiving member 62 is spline fitted to the transmission driven shaft 51, in the state of being restrained by a stop ring 63 from moving forward. A coil spring 64 is interposed between the spring receiving member 62 and the male cam member 61 (see FIGS. 6 and 7).

Therefore, the male cam member 61 is biased rearward by the coil spring 64, whereby the cam projections 61c, 61c are inserted in the cam recesses 55c, 55c of the first intermediate rotational member 55. In addition, the cam surfaces of the cam projections 61c, 61c are set in contact with those surfaces of the cam recesses 55c, 55c which faces in the rotational direction. In this manner, the cam-type torque damper 60 is configured.

Accordingly, even in the case where the torque transmitted from the drive wheel side to the transmission driven shaft 51 (which is an output shaft) is rapidly varied (increased or decreased), a damping action between the transmission driven shaft 51 and the first intermediate rotational member 55 is offered by cam contact between the cam projections 61c, 61c of the male cam member 61 and the cam recesses 55c, 55c of the first intermediate rotational member 55, in the cam-type torque damper 60. This ensures that the influence of the torque variation on the sub transmission Ts on the upstream side relative to the first intermediate rotational member 55 is suppressed. In addition, variations in torque attendant on a gear shift are also suppressed. As a result, gear shifting can be carried out smoothly.

Further, the damper springs 57a and 57b are interposed between the first intermediate rotational member 55 and the high-speed driven gear 53. In addition, the damper springs 58a and 58b are interposed between the second intermediate rotational member 56 (which is rotated as one body with the first intermediate rotational member 55) and the low-speed driven gear 54. Thus, a double arrangement of the cam-type torque damper and the damper springs 57a, 57b, 58a, and 58b is interposed between the transmission driven shaft 51 and the high-speed driven gear 53 and, also, between the transmission driven shaft 51 and the low-speed driven gear 54.

The double torque damper arrangement makes it possible to further suppress variations in torque attendant on gear shifting and variations in torque from the drive wheel side, to enable smooth gear shifting, and to reduce vibrations of the sub transmission Ts and the power unit P.

In addition, since the cam-type torque damper 60 and the damper springs 57a, 57b, 58a, and 58b are compactly incorporated on the inside of the high-speed driven gear 53 and the low-speed driven gear 54 around the transmission driven shaft 51, it is possible to contrive reductions in size in regard of the sub transmission Ts and the power unit P.

Referring to FIG. 6, of the intermediate gear shaft 71 located on an oblique upper side of the transmission driving shaft 41 and the transmission driven shaft 51, the front end is borne by the bearing 75f fitted in the bearing recess in the front-side sub transmission case 40f, whereas the rear end is borne by the bearing 75r fitted in the bearing recess in the rear-side sub transmission case 40r, whereby the intermediate gear shaft 71 is rotatably supported (see FIGS. 6 and 7).

The intermediate gear shaft 71 is formed with a large-diameter intermediate gear 72 at a rear portion thereof, and with a small-diameter intermediate gear 73 at a front portion thereof. The large-diameter intermediate gear 72 on the rear side is meshed with the reverse driving gear 45 rotatably supported on the transmission driving shaft 41 (see FIG. 6). The small-diameter intermediate gear 73 on the front side is meshed with the low-speed driven gear 54 rotatably supported on the transmission driven shaft 51 (see FIG. 7).

A shift drive mechanism 80 by which the high-speed switching shifter member 46 and the low/reverse switching shifter member 48 on the transmission driving shaft 41 are moved in the axial direction is provided on the left side (the right side in FIG. 4) of the transmission driving shaft 41, in other words, on the lower side on the crankshaft 21 side.

A shift fork shaft 81 penetrates, and axially slidably supports, the shift fork 82 fitted in the shift fork groove 46v in the high-speed switching shifter member 46, and the shift fork 83 fitted in the shift fork groove 48v in the low/reverse switching shifter member 48. The shift fork shaft 81 is mounted at a position on an oblique left lower side of the transmission driving shaft 41, with its front and rear ends supported by the front-side sub transmission case 40f and the rear-side sub transmission case 40r (see FIGS. 4 and 7).

A shift drum 90 is provided on a further left lower side of the shift fork shaft 81 (see FIG. 4).

Referring to FIG. 7, the shift drum 90 has a drum support shaft 92 projecting forward from the front end of a cylindrical drum body 91. The drum support shaft 92 penetrates, and is rotatably borne by, the front-side sub transmission case 40f. A flower-shaped cam 93 is firmly attached to the rear end of the drum body 91. A center shaft 93a projecting to the rear side of the flower-shaped cam 93 is borne in a bearing recess of the rear-side sub transmission case 40r through a bearing 95.

A shift drum input gear 94 is fitted to the drum support shaft 92 (projecting to the front side of the shift drum 90) along an inner surface of the front-side sub transmission case 40f.

In addition, the front end of the drum support shaft 92 which penetrates, and protrudes from, the front-side sub transmission case 40f is coaxially connected to a driving shaft of a shift position sensor 96. The turning angle of the shift drum 90 is detected by the shift position sensor 96.

An outer circumferential surface of the drum body is formed with guide grooves 91f and 91r located respectively on the front and rear sides and having required shapes along the circumferential direction. Projectingly formed engaging pin parts 82p and 83p of the shift forks 82 and 83 are slidably engaged in the guide grooves 91f and 91r. With the shift drum 90 rotated, the shift forks 82 and 83 are moved in the axial direction while being guided respectively by the guide grooves 91f and 91r, so as to move the high-speed switching shifter member 46 and the low/reverse switching shifter member 48, thereby performing a gear shift.

Referring to FIG. 4, a shift spindle 101 is arranged on the lower side of the shift fork shaft 81, with its front and rear ends rotatably borne on the front-side sub transmission case 40f and the rear-side sub transmission case 40r. The base end of the shift operating lever 100 is fitted to that front end of the shift spindle 101 which penetrates, and protrudes forward from, the front-side sub transmission case 41 (see FIG. 3).

A sector-shaped gear shift arm 102 is fitted to a predetermined position of the shift spindle 101. The gear shift arm 102 is meshed with the shift drum input gear 94 fitted to the drum support shaft 92 projecting to the front side of the shift drum 90 (see FIG. 8).

In addition, on the shift spindle 101, a parking operation arm 111 is swingably supported rearwardly of the gear shift arm 102. A torsion spring 113 is interposed between the shift spindle 101 and the parking operation arm 111 so that turning of the shift spindle 101 is transmitted to and converted into swinging of the parking operation arm 111 through the torsion spring 113 (see FIG. 8).

A roller 112 is rotatably supported on the tip end of the parking operation arm 111 (see FIG. 4).

Referring to FIG. 4, on the right side of the shift spindle 101 and on the lower side of the transmission driving shaft 41, a lever support shaft 115 is arranged while being oriented in the longitudinal vehicle direction, with its front and rear ends supported respectively on the front-side sub transmission case 40f and the rear-side sub transmission case 40r. In addition, a parking lock lever 116 is swingably arranged, with its base end supported on the lever support shaft 115.

Referring to FIG. 4, which is a front view, the parking lock lever 116 is provided to extend obliquely upward between the low-speed shift clutch receiving member 49 and the parking operation arm 111, from its base end, which end is located at the same position in the longitudinal vehicle direction as the low-speed shift clutch receiving member 49 supported on the transmission driving shaft 41 and is supported by the lever support shaft 115.

An outer circumferential surface of the low-speed shift clutch receiving member 49 is formed with a plurality of parking lock grooves 49p arrayed in the circumferential direction.

The parking lock lever 116 is biased clockwise, in front view, by a torsion spring 117 wound around the lever support shaft 115. The parking lock lever 116 has its tip end contacted by a stopper 118 projected at a predetermined position from the rear-side sub transmission case 40r, whereby swinging of the parking lock lever 116 is restricted.

A locking projection 116a is projectingly formed at that edge of the parking lock lever 116 which faces to the outer circumferential surface of the low-speed shift clutch receiving member 49. At that edge of the parking lock lever 116 on the opposite side which faces the parking operation arm 111, a parking recess 116p is formed in an inclined surface contacted by the roller 112 provided at the tip end of the parking operation arm 111 (see FIG. 4).

The parking operation arm 111, the parking lock lever 116 and the parking lock groove 49p of the low-speed shift clutch receiving member 49 constitute a parking drive mechanism 110.

FIG. 4 shows the sub transmission Ts being in a neutral state. In this state, the parking lock lever 116 biased by the torsion spring 117 is located in contact with the stopper 118 and separate from the outer circumferential surface of the low-speed shift clutch receiving member 49.

Referring to FIG. 4, when the shift spindle 101 is turned counterclockwise to cause the parking operation arm 111 to swing rightward (leftward in FIG. 4) and the roller 112 at the tip end of the parking operation arm 111 makes contact with the inclined surface of the parking lock lever 116 and rolls, the parking lock lever 116 is swung obliquely upward. In this instance, the locking projection 116a of the parking lock lever 116 is pressed by the outer circumferential surface of the low-speed shift clutch receiving member 49 and is engaged with the parking lock groove 49p, resulting in that the parking lock lever 116 restrains rotation of the low-speed shift clutch receiving member 49.

The state indicated by two-dotted chain lines in FIG. 4 shows a parking state wherein rotation of the low-speed shift clutch receiving member 49 is prohibited.

Specifically, when rotation of the low-speed shift clutch receiving member 49 is restrained, referring to FIG. 6, the low-speed driving gear 44 integral with the low-speed shift clutch receiving member 49 is also restrained from rotation, so that the low-speed driven gear 54 meshed with the low-speed driving gear 44 is restrained from rotation. Therefore, the transmission driven shaft (output shaft) 51 interlocked with the low-speed driving gear 54 through the damper springs 57a, 57b, 58a, and 58b and the cam-type torque damper 60 is restrained from rotation. As a result, a parking state is established.

Thus, rotation of the transmission driven shaft (output shaft) 51 is restrained through the meshing between the low-speed driving gear 44 and the low-speed driven gear 54 which are set to have a high transmission gear ratio. Therefore, rotation of the transmission driven shaft (output shaft) 51 can be restrained with a comparatively strong force at the time of parking.

The turning of the shift spindle 101 causes turning of the gear shift arm 102 fitted to the shift spindle 101, which causes the shift drum input gear 94 meshed with the gear shift arm 102 to turn together with the shift drum 90. This causes the shift forks 82 and 83 to be guided respectively by the guide grooves 91f and 91r of the shift drum 90, whereby the high-speed switching shifter member 46 and the low/reverse switching shifter member 48 are moved, to make a gear shift.

The above-mentioned parking state is set by this turning of the shift spindle 101.

The shift operating lever 100 fitted to the forwardly projecting front end of the shift spindle 101 is connected to the shift cable 121 extending from the parking operation lever 120 disposed at the operation panel 130, as above-mentioned, and the shift spindle 101 is turned by an operation of the parking operation lever 120.

Figure 12:
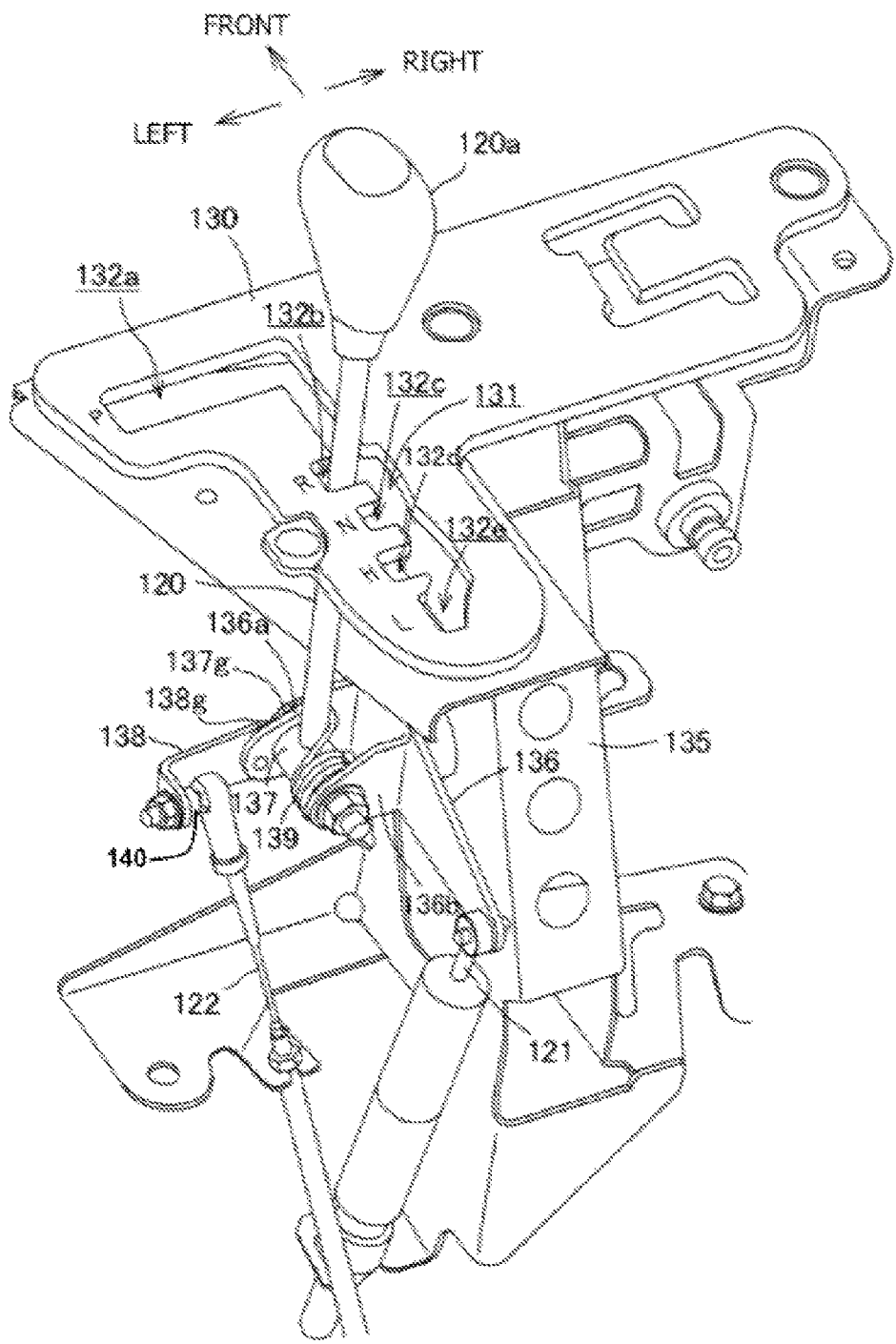
FIG. 12 is a perspective view showing an operating mechanism of a parking operation lever.

An operating mechanism of the parking operation lever 120 is illustrated in FIG. 12 and will be described below.

The operation panel 130 is formed with a longitudinal slot 131 which is elongated in the longitudinal vehicle direction (front-rear direction). At the front end of the longitudinal slot 131, a long recess 132a is formed which extends horizontally after bending to the left side. At the left side edge of the longitudinal slot 131, short recesses 132b, 132c, 132d, and 132e are formed in this order from the front side toward the rear side.

The long recess 132a at the front end is a parking position. As for the short recesses arranged along the direction from the front side toward the rear side, the short recess 132b is a reverse position, the short recess 132c is a neutral position, the short recess 132d is a high-speed forward position, and the short recess 132e is a low-speed forward position.

A support column 135 extends downward from the operation panel 130, and a swing lever 136 has its front end supported on a left side surface of the support column 135. One end of the shift cable 121 is bound to a vertically swingable rear end of the swing lever 136.

At a base end portion of the swing lever 136, a pair of front and rear brackets 136a and 136b are provided to project leftward. A swing pivot shaft 137 is turnably arranged between the pair of front and rear brackets 136a and 136b. The parking operation lever 120 penetrates the longitudinal slot 131 roughly vertically. Of the parking operation lever 120, the upper end is a grip 120a, and the lower end is firmly attached to the swing pivot shaft 137.

On the bracket 136a, a swing lever 138 extends leftward, with its base end swingably supported on a pivot shaft 140. A gear 137g fitted to the swing pivot shaft 137 and a gear 138g formed at the base end of the swing lever 138 are meshed with each other. One end of the parking cable 122 is bound to a vertically swingable left end of the swing lever 138.

The parking operation lever 120 can be swung toward the front and rear sides through swinging of the swing lever 136, and can be swung toward the left and right sides through swinging of the swing lever 138, which is integral with the swing pivot shaft 137.

A torsion coil spring 139 is wound around the swing pivot shaft 137. One end of the torsion coil spring 139 is locked to the bracket 136b, whereas the other end is locked to the parking operation lever 120. In this way, the torsion coil spring 139 is biasing the parking operation lever 120 toward the left side.

Therefore, under the function of the torsion coil spring 139, the parking operation lever 120 is fitted into and stabilized in one of the long recess 132a and the short recesses 132b, 132c, 132d, and 132e, which are formed to extend leftward from the longitudinal slot 131.

With the parking operation lever 120 operated toward the front or rear side along the longitudinal slot 131, the swing lever 136 is swung vertically, to cause a pushing/pulling operation of the shift cable 121. In this case, the shift operating lever 100 provided at a front surface of the sub transmission Ts is swung toward the left or right side, to turn the shift spindle 101, whereby a gear shift and a parking stop can be performed, as above-mentioned.

When the parking operation lever 120 is swung forward to the front end of the longitudinal slot 131, the torsion coil spring 139 causes the parking operation lever 120 to swing leftward within the long recess 132a into the parking position. This leftward swing of the parking operation lever 120 causes an upward swing of the swing lever 138 through the meshing between the gears 137g and 138g, leading to a pulling operation of the parking cable 122. As a result, the differential lock mechanism 160 added to the rear differential gear unit 9 on the rear side of the vehicle body is operated.

Figure 13:
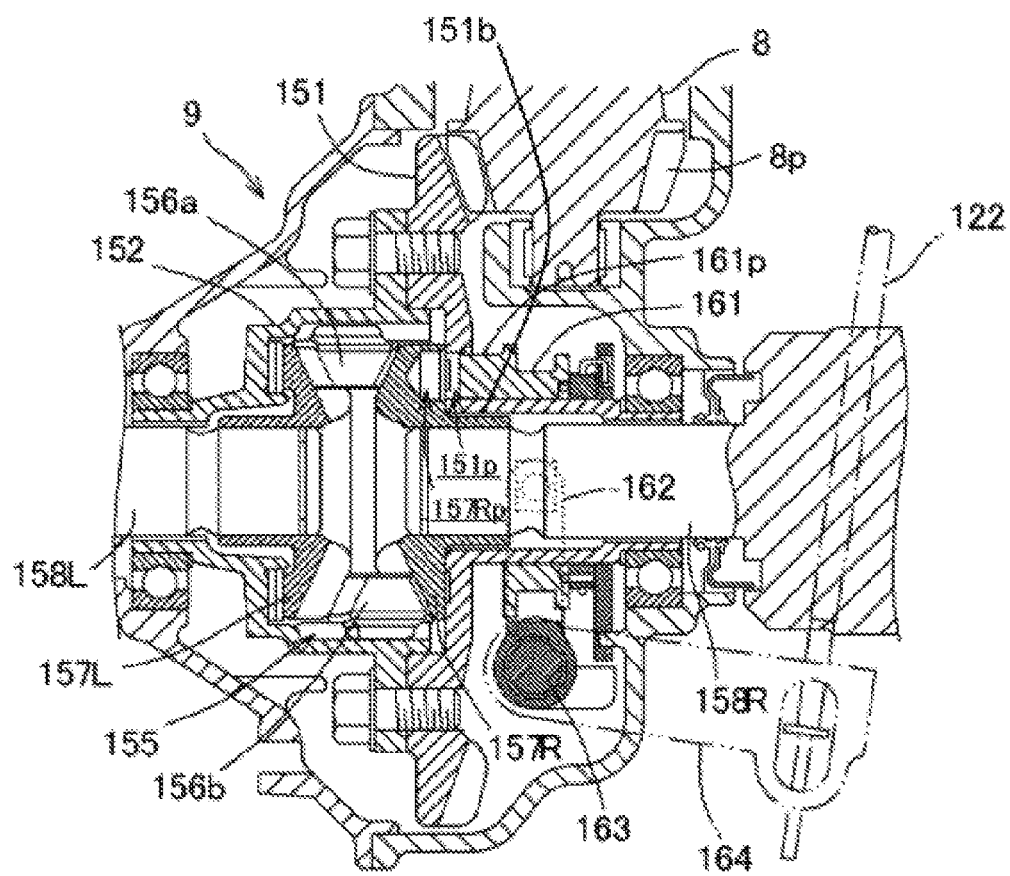
FIG. 13 is a sectional view of a rear differential device.

Referring to FIG. 13, the rear differential gear unit 9 has a configuration wherein a differential case 152 is integrally attached to a ring gear 151 rotated through meshing with a pinion gear 8*p* provided at the rear end of the rear drive shaft 8, and a differential mechanism part 155 is disposed inside the differential case 152.

The differential mechanism part 155 can include: two kinds of input-side blocks 156*a* and 156*b* rotated as one body with the differential case 152. Left and right output-side cams 157L and 157R are capable of independent rotation through frictional forces between themselves and the input-side blocks 156*a* and 156*b*. Left and right rear axles 158L and 158R are fitted respectively in shaft holes formed in the left and right output-side cams 157L, 157R, for integral rotation with the latter.

In the case where no difference in rotating speed is generated between the left and right output-side cams 157L, 157R, the input-side blocks 156*a* and 156*b*, and the left and right output-side cams 157L and 157R are not put into relative rotations but put into integral rotation. Where a difference in rotating speed is generated between the left and right output-side cams 157L and 157R, the input-side blocks 156*a* and 156*b* show relative rotations while generating frictional forces between themselves and the left and right output-side cams 157L and 157R, respectively.

The differential lock mechanism 160 is incorporated in this rear differential gear unit 9.

The ring gear 151 has a cylindrical boss part 151*b* relatively rotatably fitted onto the outer circumference of a cylindrical part constituting a shaft hole of the right output-side cam 157R. An annular member 161 is fitted onto an outer circumferential surface of the cylindrical boss part 151*b* in an axially slidable manner. The annular member 161 is provided with three leftwardly projecting lock pins 161*p* which are arrayed in the circumferential direction. The ring gear 151 is provided with pin holes 151*p* at portions facing to the three lock pins 161*p*, and the lock pins 161*p* are inserted in the pin holes 151*p*.

The right output-side cam 157R is also provided with three rightwardly opening pin holes 157R*p*. Depending on the relative rotational position of the right output-side cam 157R relative to the ring gear 151, the three pin holes 157R*p* in the right output-side cam 157R come to be coaxial with the three pin holes 151*p* in the ring gear 151. When the lock pins 161*p* are inserted into the pin holes 157R*p* in the right output-side cam 157R, each lock pin 161*p* is inserted in both of the two pin holes 161*p* and 157R*p*, whereby the ring gear 151 and the right output-side cam 157R are interconnected and rotated as one body. Therefore, the left output-side cam 157L is also rotated as one body with them, since it is connected to them through the input-side blocks 156*a* and 156*b*. As a result, a differential lock state in which differential operation is stopped is established.

A fork member 162, which is engaged with an engaging groove in the annular member 161 having the lock pins 161*p* of the differential lock mechanism 160, and which moves the annular member 161, has its base end fitted to a lever shaft 163. An end portion of the parking cable 122 is bound to the tip end of a leer member 164 fitted to this lever shaft 163.

Therefore, when a pulling operation is applied to the parking cable 122 by the parking operation lever 120, the lever member 164 turns the lever shaft 163. The turning of the lever shaft 163 causes a leftward sliding of the annular member 161 through the fork member 162. As a result, the lock pins 161*p* inserted in the pin holes 151*p* in the ring gear 151 are inserted into the pin holes 157R*p* in the right output-side cam 157R, to stop a differential operation, thereby establishing a differential lock state.

Specifically, referring to FIG. 12, when the parking operation lever 120 is swung forward to the front end of the longitudinal slot 131 and swung leftward within the long recess 132*a* to come into the parking position, a pulling operation of the parking cable 122 is brought about. As a result, the differential lock mechanism 160 added to the rear differential gear unit 9 on the rear side of the vehicle body is operated, to establish a differential lock state.

When the parking operation lever 120 is swung forward to the front end of the longitudinal slot 131, a pulling operation of the shift cable 121 is brought about. By this, the shift operating lever 100 fitted to the front end of the shift spindle 101 penetrating the sub transmission case 41 to protrude forward is swung to the right side. This causes the shift spindle 101 to turn, whereby the parking operation arm 111 is swung rightward (leftward in FIG. 4), as above-mentioned. The parking operation arm 111 thus swung rightward acts on the parking lock lever 116 so that the locking projection 116*a* of the parking lock lever 116 is engaged into the parking lock groove 49*p* in the outer circumferential surface of the low-speed shift clutch receiving member 49, resulting in a parking state wherein rotation of the low-speed shift clutch receiving member 49 is prohibited. Namely, there is established a parking state wherein rotation of the transmission driven shaft (output shaft) is restrained, as above-mentioned. Therefore, rotation of the rear drive shaft 8 is restrained.

The parking brake system in this embodiment is configured as above. Therefore, when the parking operation lever 120 is put into the parking position, the sub transmission Ts is put into the parking state, so that rotation of the rear drive shaft 8 is restrained. Simultaneously, the differential lock mechanism 160 added to the rear differential gear unit 9 is operated to make a differential lock state, in which a differential operation is stopped. Consequently, the left and right rear wheels 3, 3 are fixed. Thus, an assured parking brake state is established.

While the parking state established by operating the parking operation lever 120 has been described above, other shift operations than the parking will be described below.

FIGS. 4 to 7 show a state wherein the gear is in the neutral position. In this state, the parking operation lever 120 is located in the short recess 132*c* in the operation panel 130.

When the parking operation lever 120 is swung one step forward from this state and thereby put into the short recess 132*b* to rest in a reverse position, a pulling operation of the shift cable 121 is effected to turn the shift spindle 101, whereby the gear shift arm 102 is swung rightward. The gear shift arm 102 thus swung rightward turns the shift drum 90 through the meshing with the shift drum input gear 94. This causes the low/reverse switching shifter member 48 to move rearward, referring to FIG. 7, into engagement with the reverse clutch receiving member 50. Therefore, rotation of the transmission driving shaft 41 is transmitted to the intermediate gear shaft 71 through the meshing between the reverse driving gear 45 and the large-diameter intermediate gear 72. The rotation of the intermediate gear shaft 71 is transmitted to the transmission driven shaft (output shaft) 51 through the meshing between the small-diameter intermediate gear 73 and the low-speed driven gear 54.

Accordingly, the rotation of the transmission driving shaft 41 is transmitted through the intermediate gear shaft 71 to put the transmission driven shaft (output shaft) 51 into reverse rotation, establishing a reverse state.

When the parking operation lever 120 is swung further forward from this reverse state, the above-mentioned parking state is established.

When the parking operation lever 120 is swung one step rearward from the neutral state and thereby put into the short recess 132c to rest in a high-speed forward position, a pushing operation of the shift cable 121 is effected to turn the shift spindle 101, whereby the gear shift arm 102 is swung leftward. The gear shift arm 102 thus swung turns the shift drum 90 through the meshing with the shift drum input gear 94. This causes the high-speed switching shifter member 46 to move rearward, referring to FIG. 6, into engagement with the high-speed shift clutch receiving member 47. Therefore, rotation of the transmission driving shaft 41 is transmitted to the transmission driven shaft (output shaft) 51 through the meshing between the high-speed driving shaft 43 and the high-speed driven shaft 53. Thus, a high-speed forward gear state is established.

When the parking operation lever 120 is swung further rearward from this high-speed forward state and thereby put into the short recess 132d to rest in a low-speed forward gear position, a further pushing operation of the shift cable 121 is brought about, leading to a further turning of the shift drum 90. This causes the high-speed switching shifter member 46 to move forward, referring to FIG. 6, to be thereby disengaged from the high-speed shift clutch receiving member 47. In this case, the low/reverse switching shifter member 48 is moved forward into engagement with the low-speed shift clutch receiving member 49. Therefore, rotation of the transmission driving shaft 41 is transmitted to the transmission driven shaft (output shaft) 51 through the meshing between the low-speed driving gear 44 and the low-speed driven gear 54. Thus, a low-speed forward gear state is established.

According to the sub transmission Ts in this embodiment, the above-mentioned gear shifts are carried out by manual operations of the parking operation lever 120.

The high-speed forward gear state is operated with two wheel drive, while the low-speed forward gear state and the reverse gear state are operated with four wheel drive.

Figure 8:
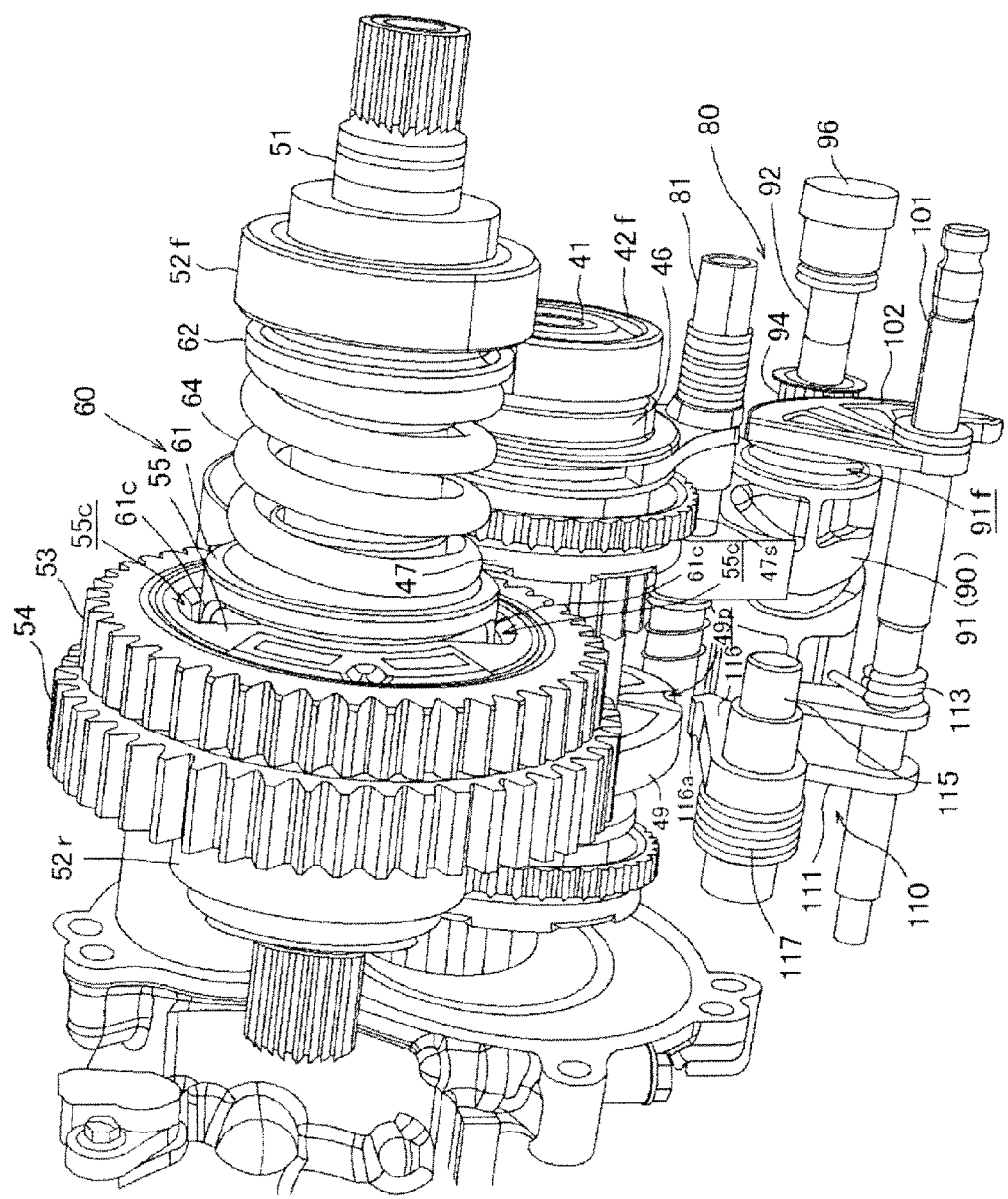
FIG. 8 is a perspective view of the sub transmission.

The parking brake system for the all terrain vehicle 1 in certain embodiments includes the parking drive mechanism 110. Referring to FIGS. 1, 4 and 8, the parking drive mechanism 110 is so configured that, by turning of the shift spindle 101 as an input shaft of the shift drive mechanism 80 for changing the shift position in the sub transmission Ts, the parking rotation-restraining lever 116 as a restraining member is operated to prohibit rotation of the shift clutch receiving member 49, whereby rotation of the transmission driving shaft 41 and the transmission driven shaft 51 is restrained, thereby establishing a parking brake state. As shown in FIG. 12, the shift cable 121 connected to the shift spindle 101 is connected to the parking operation lever 120, whereby it is ensured that gear shift operations are also performed by the parking operation lever 120 provided for carrying out a parking operation. Therefore, it is possible to reduce the number of component parts and to realize a simplified structure. In addition, the parking operation can also be conducted in the manner of extending the gear shift operations. Thus, the parking brake system is excellent in operability.

The differential lock mechanism 160 of the rear differential gear unit 9 is operated by a parking operation of the parking operation lever 120 through the parking cable 122. Therefore, it is possible, by ensuring that the parking drive mechanism 110 operates the parking rotation-restraining lever 116 separately through the shift cable 121 in response to the parking operation of the parking operation lever 120 so as thereby to restrain rotation of the transmission driving shaft 41 and the transmission driven shaft 51, to fix or restrain rotation of the rear wheels 3, 3 and the front wheels 2, 2 as the pairs of left and right drive wheels. Thus, it is possible to put the all terrain vehicle as a four-wheel drive vehicle into a parking brake state.

The power unit P in certain embodiments includes the main transmission Tm on the upstream side, with respect to power transmission, and the sub transmission Ts on the downstream side. The parking drive mechanism 110 is provided on the sub transmission Ts. By operating the parking rotation-restraining lever 116, the transmission driving shaft 41 and the transmission driven shaft 51 in the sub transmission Ts are restrained from rotation, whereby a parking brake state is established. This means that the transmission driving shaft 41 and the transmission driven shaft 51 in the sub transmission Ts close to the front wheels 2, 2 and the rear wheels 3, 3 are restrained from rotation. Therefore, the drive wheels (3, 3) can be fixed, with reduced chattering.

In addition, the sub transmission Ts has a small number of gear positions, and the operational range of the parking operation lever 120 has an allowance. Therefore, even where the parking operation is incorporated in the operational range, the operational range for the parking position can be made comparatively large, and good operability can be maintained.

The parking drive mechanism 110 in certain embodiments is so configured that, by swinging the parking rotation-restraining lever 116 provided as a restraining member, the locking projection 116a of the parking rotation-restraining lever 116 is locked into the parking lock groove 49p formed in the outer circumference of the low-speed shift clutch receiving member 49 supported on the transmission driving shaft 41, resulting in a parking brake state. Therefore, the low-speed shift clutch receiving member 49 for receiving the clutch teeth 48t of the low/reverse switching shifter member 48 can be used also for parking. Accordingly, it is possible to reduce the number of component parts and to reduce the size of the sub transmission Ts.

The sub transmission Ts includes the high-speed shift clutch receiving member 47 and the low-speed shift clutch receiving member 49, and the parking lock groove 49p is formed in the outer circumference of the low-speed shift clutch receiving member 49. In addition, rotation of the low-speed shift clutch receiving member 49 is restrained by the parking rotation-restraining lever 116. As a result, rotation of the transmission driven shaft (output shaft) 51 is restrained by the meshing between the low-speed driving gear 44 and the low-speed driven gear 54 having a high transmission gear ratio (see FIG. 6). Therefore, rotation of the transmission driven shaft (output shaft) 51 can be restrained by a comparatively large force at the time of parking. In addition, a reduction in the size of the sub transmission Ts can be contrived.

DESCRIPTION OF REFERENCE SYMBOLS

P . . . Power unit, E . . . Internal combustion engine, Tm . . . Main transmission, Is . . . Sub transmission;
1 . . . All terrain vehicle, 2 . . . Front wheel, 3 . . . Rear wheel, 6 . . . Front drive shaft, 7 . . . Front differential gear unit, 8 . . . Rear drive shaft, 9 . . . Rear differential gear unit;
41 . . . Transmission driving shaft, 43 . . . High-speed driving gear, 44 . . . Low-speed driving gear, 46 . . . High-speed switching shifter member, 47 . . . High-speed shift clutch receiving member, 48 . . . Low/reverse switching shifter member, 49 . . . Low-speed shift clutch receiving member, 49p . . . Parking lock groove, 50 . . . Reverse clutch receiving member, 51 . . . Transmission driven shaft (output shaft), 53 . . . High-speed driven gear, 54 . . . Low-speed driven gear;

100 . . . Shift operating lever, 101 . . . Shift spindle, 110 . . . Parking drive mechanism, 111 . . . Parking operation arm, 116 . . . Parking lock lever, 116a . . . Locking projection;

120 . . . Parking operation lever, 121 . . . Shift cable, 122 . . . Parking cable, 130 . . . Operation panel, 155 . . . Differential mechanism part, 160 . . . Differential lock mechanism, 161p . . . Lock pin, 164 . . . Lever member.

We claim:

1. A vehicle, comprising:

a power transmission system configured to transmit power of an internal combustion engine to drive wheels through a transmission; and a parking brake system configured to restrain rotation of the drive wheels by engaging with a part of the power transmission system, wherein the parking brake system comprises a parking drive mechanism configured to operate a restraining member, by turning of an input shaft of a shift drive mechanism configured to change a shift position in the transmission, wherein a parking operation arm is swingably arranged on the input shaft, and wherein the turning of the input shaft causes the swinging of the parking operation arm, wherein rotation of a transmission gear shaft is restrained, thereby establishing a parking brake state, and wherein a shift cable connected to the input shaft is connected to a parking operation lever.

2. The vehicle according to claim 1, wherein the vehicle comprises a four-wheel drive vehicle, wherein the drive wheels are provided in a left-right pair, and are configured to receive power transmitted thereto through a differential gear unit, wherein the differential gear unit includes a differential lock mechanism, and wherein the differential lock mechanism is configured to be operated by a parking operation of the parking operation lever through a parking cable.

3. A vehicle comprising:

a power transmission system configured to transmit power of an internal combustion engine to drive wheels through a transmission; and a parking brake system configured to restrain rotation of the drive wheels by engaging with a part of the power transmission system, wherein the parking brake system comprises a parking drive mechanism configured to operate a restraining member, by turning of an input shaft of a shift drive mechanism configured to change a shift position in the transmission, wherein rotation of a transmission gear shaft is restrained, thereby establishing a parking brake state, wherein a shift cable connected to the input shaft is connected to a parking operation lever, wherein the transmission includes a main transmission on an upstream side with respect to power transmission, and a sub transmission on a downstream side with respect to the power transmission, and wherein the parking drive mechanism is provided on the sub transmission, and is configured to operate the restraining member to restrain rotation of the transmission gear shaft of the sub transmission, thereby establishing the parking brake state.

4. The vehicle according to claim 3, wherein the parking drive mechanism is configured to swing the restraining member to lock a locking part of the parking rotation-restraining lever into a lock groove formed in an outer circumference of a shift clutch receiving member, thereby establishing the parking brake state.

5. The vehicle according to claim 4, wherein the sub transmission includes a high-speed shift clutch receiving member, and a low-speed shift clutch receiving member, and wherein the shift clutch receiving member is the low-speed shift clutch receiving member.

\* \* \* \* \*